United States Patent

Blum et al.

[11] Patent Number: 6,162,840
[45] Date of Patent: Dec. 19, 2000

[54] IMPREGNATION, SEALING AND COATING COMPOUNDS

[75] Inventors: Rainer Blum, Ludwigshafen; Thomas Loerzer, Landau; Günther Hegemann, Hamburg; Manfred Eichhorst, Oststeinbek, all of Germany

[73] Assignee: Dr. Beck + CO.AG, Hamburg, Germany; .

[21] Appl. No.: 09/101,240

[22] PCT Filed: Dec. 30, 1996

[86] PCT No.: PCT/EP96/05862

§ 371 Date: Jul. 6, 1998

§ 102(e) Date: Jul. 6, 1998

[87] PCT Pub. No.: WO97/25362

PCT Pub. Date: Jul. 17, 1997

[30] Foreign Application Priority Data

Jan. 4, 1996 [DE] Germany ............... 196 00 149

[51] Int. Cl.[7] ............... C08F 2/50; C08F 63/199; C08F 63/52; C08L 31/06; C08G 63/137
[52] U.S. Cl. ............... 522/24; 522/13; 522/35; 522/104; 522/107; 522/179; 522/904; 522/905; 528/289; 528/291; 528/292; 528/300; 528/302; 528/303; 528/306; 528/307
[58] Field of Search ............... 522/104, 107, 522/904, 905, 179, 35, 24, 13; 528/289, 291, 292, 300, 302, 303, 306, 307

[56] References Cited

U.S. PATENT DOCUMENTS

| | | | |
|---|---|---|---|
| 4,066,606 | 1/1978 | Vargiu et al. | 260/40 |
| 4,077,939 | 3/1978 | Paparatto et al. | 260/40 |
| 4,477,636 | 10/1984 | Muroi et al. | 522/104 |
| 4,698,295 | 10/1987 | Pfeifer et al. | 522/905 |
| 4,801,629 | 1/1989 | Stavinoha et al. | 523/500 |
| 4,921,883 | 5/1990 | Meixner et al. | 522/107 |
| 5,248,805 | 9/1993 | Boettcher et al. | 522/905 |
| 5,780,558 | 7/1998 | Klang et al. | 522/6 |

FOREIGN PATENT DOCUMENTS

| | | |
|---|---|---|
| 101585 | 2/1984 | European Pat. Off. . |
| 118786 | 9/1984 | European Pat. Off. . |
| 186165 | 7/1986 | European Pat. Off. . |
| 260688 | 3/1988 | European Pat. Off. . |
| 275034 | 7/1988 | European Pat. Off. . |
| 684284 | 11/1995 | European Pat. Off. . |
| 3107450 | 2/1981 | Germany . |
| 3230924 | 8/1982 | Germany . |

*Primary Examiner*—Susan Berman
*Attorney, Agent, or Firm*—Keil & Weinkauf

[57] ABSTRACT

The invention concerns the use of monomer-free saturated or unsaturated polyester resins or mixtures of saturated and unsaturated polyester resins containing structural units of general formulae (I) and/or (II), in which n=1–10, as impregnation, sealing and coating compounds for electrical engineering and electronic components and for carrier substances for flat insulating materials.

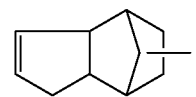

(I)

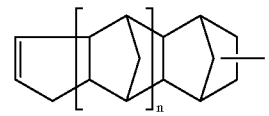

(II)

13 Claims, No Drawings

IMPREGNATION, SEALING AND COATING COMPOUNDS

The present invention relates to the use of monomer-free polyester resins as impregnating, casting and coating compositions for electrical and electronic components and for carrier materials for sheet-form insulating materials.

The polymer matrix of known impregnating, casting and coating compositions for electrical components, such as motor windings, transformer windings and the like, is composed of unsaturated polyesters dissolved in compounds containing vinylic unsaturation, such as styrene, vinyltoluene, allyl phthalate and monomeric or oligomeric acrylic or vinylesters by means of free-radically initiated copolymerization. The term impregnating, casting and coating compositions refers to resin compositions which are employed in electrical engineering by the generally known processes of dip impregnation, the trickle technique, the dip-rolling technique, the flooding technique and the process of casting for the impregnation of windings, these processes possibly being assisted by the application of reduced pressure, superatmospheric pressure or a combination of both. The term also embraces the impregnation of carrier materials for sheet-form insulating materials such as glass fibers, mica tapes and other absorbent materials, and combinations thereof, and in this context one option is to terminate curing at the B-stage in order to obtain curable prepregs.

Disadvantages of this prior art process result from the unsaturated monomers which are absolutely necessary for rapid and complete curing of the compositions. Examples of such substances are acrylates, allyl phthalate, styrene, α-methylstyrene and vinyltoluene, either in monomeric form or as low molecular mass oligomers. These substances are injurious to health and are skin irritants. Known applications of impregnating compositions using these substances are accompanied by losses in mass of 20–30%. These considerable amounts must be removed from the workplace in order to avoid a health hazard to employees. The evaporated materials, drawn off by suction, are generally disposed of in waste-air incinerators, giving rise to unwanted emissions. The incinerated substances are also associated with considerable economic losses. Furthermore, there is a risk of these monomeric substances not being incorporated completely in the course of curing. Residual monomers remaining in the cured compositions may escape, especially from electrical-insulation compositions, which generally become hot during use, and can cause odor pollution or health damage, or else they gradually undergo aftercuring in the compositions, thereby undesirably altering the service properties of such compositions.

Unsaturated polyester resins containing structural units of dihydrodicyclopentadiene (=DCPD) are the subject of numerous patents.

DE-A-31 07 450 describes unsaturated polyesters containing cyclopentadiene oligomers as end groups, which in the form of solutions in ethylenically unsaturated monomers are used to produce moldings and coatings.

EP-A-101 585 relates to unsaturated polyester resins which are modified by the addition of cyclopentadiene onto the double bond of the polyester and are then dissolved in vinyl monomers.

EP-A-118 786 relates to unsaturated polyester resins which are modified with dicyclopentadiene and, as solutions in vinyl or allyl monomers, are cured in a two-stage process in order to form molding compounds with high temperature resistance. The second stage of this process requires the use of temperatures of above 200° C. for at least one hour, preferably 250° C. for 24 hours, or irradiation with accelerated electrons with an acceleration voltage of 300–1000 kV. The good properties of such compositions is said to make them suitable for use in the electrical sector. However, the aftercuring conditions required rule out use as a casting composition for the majority of applications, since more modern electrical assemblies, comprising a combination of electrical and electronic components, are destroyed by such high temperatures. Furthermore, the long curing times are inappropriate to efficient mass production of components.

EP-A-260 688 is a development of EP-A-118786, and also relates to polyester resins dissolved in vinylic monomers. Again, a two-stage curing process is used in which a disadvantage of the previous publication, namely the high temperatures of more than 200° C. involved in aftercuring in the second stage, is mitigated in that these temperatures are reduced, by the use of a specific selection of free-radical initiators, from 200° C. to 120–200° C., preferably to 150–180° C.

DE-A-32 30 924 describes a special process for preparing polyester resins which include cyclopentadiene structures and are dissolved in vinyl monomers.

EP 0 684 284-A1 describes synergistic mixtures of unsaturated polyether ester resins and dicyclopentadiene polyester resins, which are dissolved in styrene and are cured in the presence of peroxidic catalysts.

DE-A-26 48 351 and DE-A-26 48 352 relate to unsaturated polyester resin formulations (molding compounds) which are stable on storage at room temperature in the form of solid, dust-free granules with incorporated fillers, for example glass fibers, and incorporated catalysts, and without the use of unsaturated monomers such as styrene. For processing they are melted, with the melt being stable for a short period, sufficient for processing, and then cured under the action of heat. Injection molding is the preferred processing technique.

It is an object of the present invention to remove the abovementioned disadvantages of the known prior art.

We have found that this object is achieved, surprisingly, by the novel incorporation of dihydrodicyclopentadiene structures during the preparation of the polyesters and by their specific overall structure, whereby systems which are stable on storage and liquid even at room temperature, or systems having such a low softening point that ready-to-process melts remain stable on storage in unchanged form for very long periods, are obtained without monomers containing vinylic unsaturation. Furthermore, these systems are suitable for combined curing by UV light and heat.

The present invention provides for the use of monomer-free, especially styrene-free, saturated or unsaturated polyester resins, or mixtures of saturated and unsaturated polyester resins, which contain structural units of the general formulae (I) and/or (II)

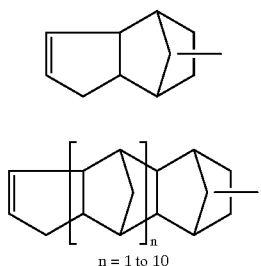
(I)

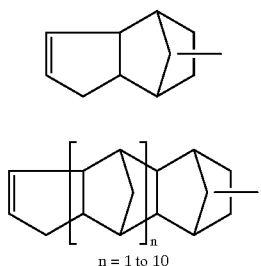
(II)
n = 1 to 10 as impregnating, casting and coating compositions for electrical and electronic components and for carrier materials for sheet-form insulating materials.

The structural units of the general formula (I) and/or (II) are preferably incorporated in the form of esters of dihydrodicyclopentadienol with monomeric or polymeric carboxylic acids, comprising groups of the formula (III), and/or in the form of esters of oligodihydrodicyclopentadienol with monomeric or polymeric carboxylic acids, comprising groups of the formula (IV)

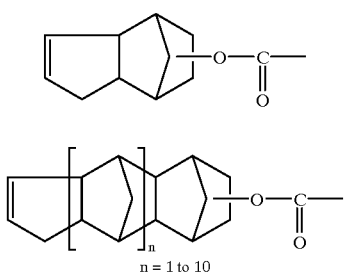
(III)

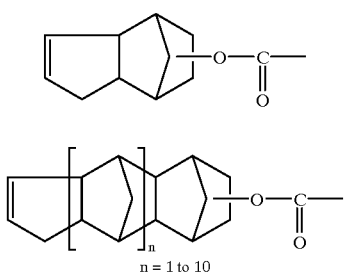
(IV)
n = 1 to 10

It is particularly preferred for the structural units of the formulae (I) and/or (II) to have been introduced by using compounds of the formulae (V) and/or (VI)

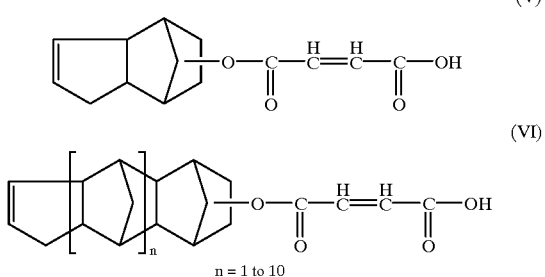
(V)

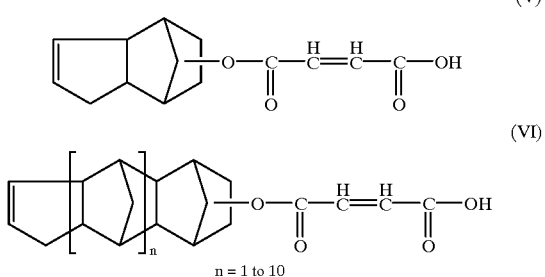
(VI)
n = 1 to 10 ie. by means of dihydrodicylopentadienol monoesters of maleic and fumaric acid and/or by means of monoesters of maleic and fumaric acid with oligomers of the dihydrodicyclopentadienol.

Also preferred is the use of those polyesters which have been synthesized using alcohols and polyols which are ethoxylated or propoxylated, and of polyesters which have been synthesized using mono- or polyhydric alcohols of the polyesterpolyol or polyetherpolyol type, for example polyethylene oxide, polypropylene oxide or polytetrahydrofuran.

For the synthesis of the polyesters it is also advantageous to use ethylenically unsaturated structural units, especially maleic and fumaric acid.

Another advantageous embodiment of the invention is that wherein the compositions include chemically bonded photoinitiators containing xanthone, thioxanthone and/or phenone structures, where the chemically bonded photoinitiator incorporated by condensation into the polyester resin may preferably be hydroxybenzophenone and/or benzophenonetetracarboxylic acid.

The novel impregnating, casting and coating compositions can be cured with peroxides, with or without reaction-accelerating co-initiators, at room temperature or elevated temperature, possibly first of all up to a partially cured B-stage, before being cured to completion later on. Similarly, the novel impregnating, casting and coating compositions can be cured with actinic radiation, the photoinitiators required either being chemically bonded in the compositions or having being added to the compositions or else using both chemically bonded and added photoinitiators.

Another preferred embodiment of the invention is that wherein esterification products of the compounds of the formulae (V) and/or (VI) with monofunctional alcohols, polyfunctional alcohols, alkoxylation products thereof, polyetherpolyols, polyesterpolyols, such as polyethylene oxide, polypropylene oxide, polytetrahydrofuran and/or polycaprolactone are employed in addition.

It is also preferred for the impregnating, casting and coating compositions to be liquid at room temperature or to have softening ranges in accordance with DIN53180 of below 130° C., preferably below 90° C., particularly preferably below 40° C., with a viscosity below 10,000 mPas at 100° C., preferably less than 30,000 mPas at 75° C., particularly preferably less than 5000 mPas at 50° C., and to be at the same time stable in terms of viscosity for at least 24 hours at a temperature at which they have a viscosity of not more than 10,000 mPas, preferably not more than 2000 mPas. These ranges are preferably established by using the abovementioned esterification products.

It is also possible to combine curing with actinic radiation with curing with peroxides or C—C-labile substances.

Special interest also attaches to esterification products of the compounds of the formulae (V) and/or (VI) with monofunctional imido-containing alcohols or acids, for example according to DE-A-1570273 and/or polyfunctional imido-containing alcohols or acids and/or imido-containing hydroxy acids, for example according to DE-A-17 20 323.

In order to reduce the viscosity of the impregnating, casting and coating compositions it is advantageous to heat them on application or, where they are is solids, to melt them.

In specific cases it is also possible for customary, olefinically unsaturated reactive diluents to be added to the impregnating, casting and coating compositions to be used in accordance with the invention.

The novel, monomer-free impregnating, casting and coating compositions for electrical insulation can be cured both using high-energy radiation, preferably UV light, and using free radicals at room temperature, with known combinations of peroxides and co-initiators, for example heavy metal salts, and also thermally, using free-radical initiators such as peroxides, azo initiators or C—C-labile compounds. Any combination of said methods can also be used for curing. Preference is given to combined curing with thermally generated free radicals and UV-generated free radicals. It is also possible to carry out curing to a B-stage, ie. a partially cured stage at which curing is interrupted and can be restarted at a later point in time.

It is surprisingly possible to cure both saturated and unsaturated polyesters containing structural units of the formula (I) and/or (II) and meeting the above-defined conditions in respect of melting and viscosity ranges without the use of monomers containing vinylic unsaturation, both thermally and by means of radiation, preferably by a combination of these methods, and the curable polyesters are suitable for preparing high-grade electrical-insulation compositions. It is also of importance that such materials can be processed on existing plant with little or no modification.

The electrical-insulation compositions of the present invention avoid the abovementioned disadvantages by the use of specific saturated and unsaturated polyester resins containing dicyclopentadiene structural units, which can be cured without the use of other compounds containing vinylic unsaturation and can be cured both using high-energy radiation, preferably UV light, and using free radicals at room temperature, with known combinations of peroxides and co-initiators, for example heavy metal salts, and also thermally, using free-radical initiators such as peroxides, azo initiators or C—C-labile compounds. Any desired combination of said methods can also be used for curing. The resins are preferably first of all surface-cured with UV light and then cured to completion, with heating, using substances which respond to heat by forming free radicals. Another important process is that in which the insulating compositions, for example in electrical windings, are first of all cured inside the components by means of current-induced heat (Jouoe heat) and the surface, which may in some cases have cured poorly, is post-crosslinked using UV light.

The following details relate to the composition of the impregnating, casting and coating compositions to be used in accordance with the invention.

The polyesters involved are those having structural units of the general formula (I) and/or (II), which preferably carry-bonded to polycarboxylic acids-groups of the formulae (III) and/or (IV).

It is very easy to obtain the adducts of maleic anhydride and water with DCPD, of the formulae (V) and (VI), which can be used additionally in the synthesis of the compositions when the unsaturated polyesters are used in accordance with the invention.

Furthermore, dihydrodicyclopentadienol of the formula (VII) is commercially available and can be used for the synthesis of the polyesters, by means of which the structures of the formulae (I) and (II) can likewise be introduced, and saturated polyesters can be obtained.

(VII)

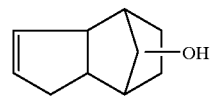

The polyester resins to be used in accordance with the invention are synthesized in accordance with the known prior art for the preparation of polyesters, generally by polycondensation of polyfunctional hydroxy compounds with polyfunctional acids and/or their anhydrides at elevated temperatures. Furthermore, it is often advantageous to start from the esters of such substances and to obtain the polyesters by transesterification at elevated temperatures, since transesterification reactions of this kind are in some cases easier and proceed more rapidly than direct esterification. Furthermore, by using polyfunctional amines it is also possible to obtain polyesters having amide structures. The use of monofunctional starting materials is also possible in order, for example, to regulate the molecular weight. The starting materials listed below are not intended to restrict the invention to them, but merely serve as examples for illustration.

Suitable starting materials are di-, tri- and tetracarboxylic acids, for example adipic acid, suberic acid, phthalic acid isomers, tetrahydrophthalic acid, endomethylenetetrahydrophthalic acid, hexahydrophthalic acid, fumaric acid, maleic acid, itaconic acid, citraconic acid, trimellitic acid, pyromellitic acid, diols, such as ethylene glycol, polyethylene glycols, propylene glycol, polypropylene glycols, butanediol isomers, hexanediol, neopentylglycol, triols and polyols, such as trimethylolpropane, glycerol, pentaerythritol, and also bisphenol A, hydrogenated bisphenol A, OH-polyfunctional polymers, such as hydroxyl-modified polybutadienes or hydroxyl-carrying polyurethane prepolymers, epoxy resins, polyfunctional natural substances or derivatives thereof, such as linseed oil fatty acid, dimeric and polymeric linseed oil fatty acid, castor oil and castor oil fatty acid.

Also possible is the introduction of amide and imide structures in accordance with DE 15 70 273 and DE 17 20 323 into polyester resins. Such polyesteramides or polyesterimides may meet particular requirements, for example those relating to thermal stability, in many cases better than pure polyesters.

The structures of the formulae (I) and (II) can preferably be introduced by using, in the course of the polycondensation, acidic esters of the formulae (III) to (VI).

Oligo-DCPD mixtures are obtained in a known manner by polycycloaddition of cyclopentadiene under superatmospheric pressure at from 170° to 300° C. These mixtures can be worked up by distillation or reacted directly with, for example, maleic anhydride and water to form substances of the formula (VI).

Furthermore, it is possible to prepare polyesters with an excess of acid and then to react these with DCPD. A high conversion here requires the use of catalysts such as, for example, boron trifluoride etherate.

At relatively high temperatures under superatmospheric pressure, oligo-DCPD structures are also formed in this reaction.

Where the polyesters in this reaction contain double bonds in the polymer chain, for example as maleic esters or fumaric esters, grafting with cyclopentadiene produces endomethylenetetrahydrophthalic acid structures of the formula (VIII).

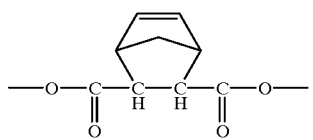
(VIII)

The synthesis of the polyesters in the context of the present invention, with specific requirements with regard, for example, to hardness, elasticity, viscosity and softening point, take place in accordance with rules which are familiar to the skilled worker who is aware, for example, that the elasticity of cured polyester resins can be varied via the chain length of the polyols or polycarboxylic acids; for example, polyester resins synthesized using hexanediol or adipic acid are more flexible than those based on phthalic acid and ethylene glycol. Also known to the skilled worker is the possibility of controlling the properties by using polyfunctional substances which produce branching in the polyester molecules, such as trimellitic acid or trimethylolpropane.

Since the groups of the formulae (I) and (II) essentially determine the reactivity and are generally terminal groups, when high molecular mass polyesters are synthesized the reactivity becomes progressively lower. A particular feature of the present invention, therefore, is the partial use of monofunctional alcohols or polyfunctional hydroxy compounds having more than two hydroxyl groups per molecule, which are esterified completely or partially with monocarboxylic of the formulae (V) and (VI) but can also be partially etherified or esterified with other substances. These substances carry the reactive group of the formula (I) or (II) two or more times in a high molar concentration, for example in the case of monoesters of lower alcohols or diols. Thus they are highly reactive crosslinking agents and may comprise the sole component of the impregnating, casting and coating compositions, but are preferably included as only part of customary polyester resins which are linear or contain low levels of branching.

Another particular feature of the present invention is the use of these substances, some of which are liquids of low viscosity and very high boiling point, as reactive diluents for establishing, in accordance with the invention, the melting and viscosity ranges already defined above.

For instance, it is possible to use polyesters of relatively high melt viscosity and high softening point for the present invention and to establish the desired low melt viscosity and the desired low softening point by addition of these substances. These substances therefore represent reactive diluents which are tailored to the novel systems, and are free from the disadvantages of the known ethylenically unsaturated reactive diluents such as styrene, for example.

Substances of this kind which may be mentioned by way of example are the esters of substances of the formulae (V) and (VI) with mono- and polyalcohols such as butanol, hexanol, butanediol, hexanediol, polyethylene glycol monoalkyl ethers, polypropylene glycol monoalkyl ethers, trimethylolpropane, pentaerythritol or more highly functional hydroxy compounds. Also of particular importance are the esters of the ethoxylation and propoxylation products of such polyfunctional hydroxy compounds, and also polyesterpolyols and polyetherpolyols of the type of polyethylene oxide, polypropylene oxide, polytetrahydrofuran and polycaprolactone. The latter substances are predominantly liquids of low viscosity.

Via the nature of the alkoxylating agents and the degree of alkoxylation it is also possible to control properties of the end products such as, for example, hardness, hydrophilicity and elasticity. Such polyols can also be esterified only partially with substances of the formulae (V) and (VI), it being possible alternatively to leave the residual hydroxyl groups free or to esterify or etherify them with other substances or to react them with other substances which react with hydroxyl groups. Examples of substances suitable for this purpose are isocyanates or epoxides. Also of importance are hydroxyl-containing natural oils, such as castor oil, for example.

The establishment of the softening temperature and of the melt viscosity of the compositions by the use of these substances is of essential importance to the novel use. By this means, and by means of the specific reactivity of the DCPD structures of the polyesters, it becomes possible to provide substances which are catalyzed ready for reaction and which can either be processed in liquid form, even at room temperature, without the use of the known reactive diluents, such as styrene, vinyltoluene, α-methylstyrene, allyl esters and (meth)acrylic esters, or can be adjusted by heating to the viscosity which is appropriate to the particular application.

Compositions which meet this requirement are resins which, at room temperature, are solid or liquid and are rigid and/or flexible, having softening ranges in accordance with DIN 53180 of below 130° C., preferably below 90° C., particularly preferably below 40° C., with a viscosity less than 100,000 mPas at 100° C., preferably less than 30,000 mPas at 75° C., particularly preferably less than 5000 mPas at 50° C., and are stable in terms of viscosity for at least 24 hours at a temperature which has a viscosity of not more than 1000 mPas, preferably not more than 2000 mPas.

These limit values which are of decisive advantage for use in accordance with the invention can be established by the use of the abovementioned substances, esterification products of the compounds of the formulae (V) and/or (VI) with monofunctional alcohols, polyfunctional alcohols, alkoxylation products thereof, polyetherpolyols, polyesterpolyols, such as polyethylene oxide, polypropylene oxide, polytetrahydrofuran and/or polycaprolactone.

These reactivity and viscosity regulators are preferably prepared separately and then mixed with the polyesters, catalysts, colorants, pigments, fillers and other auxiliaries to form ready-to-use, storage-stable compositions. In many cases, however, it is also possible to prepare such reactivity and viscosity regulators in situ during the polyester preparation, by appropriately adjusting the stoichiometric ratios.

Furthermore, it is technically possible to employ, in minor amounts, the known ethylenically unsaturated reactive diluents, for example styrene. Thus, for example, low-styrene compositions can be formulated while retaining the other good properties of the novel substances, in order, for example, to comply with statutory limits on the concentration or emission of styrene.

The polyester resins to be employed in accordance with the invention are able to cure thermally following the addition of substances which form free radicals on heating. Examples of known free-radical initiators are peroxides, azo compounds, azides and C—C-labile substances. A considerable reduction in curing time or lowering in curing temperature is possible with metal co-initiators, such as compounds of cobalt, of manganese, of iron, of nickel or of lead. The polyester resins to be used in accordance with the invention, in the presence of UV initiators of the α-cleaving type (Norrish type 1) or of H-donor/acceptor systems (Norrish type 2), exhibit high UV sensitivity.

A preferred mode of introducing H-acceptor groups is the partial use of phenone compounds incorporated by condensation, for example hydroxy- or bishydroxybenzophenone or benzophenonetetracarboxylic acid, in the course of polycondensation of the polyester resins.

The parts and percentages given in the following examples are by weight unless stated otherwise.

EXAMPLE 1

| | |
|---|---|
| 317.1 g of dihydrodicyclopentadienol | (2.1 mol) |
| 292.3 g of adipic acid | (2.0 mol) |
| 101.3 g of 1,6-hexanediol | (1.0 mol) and |
| 0.7 g of dibutyltin dilaurate (DBTL) | | were weighed into a stirring flask fitted with heating and distillation devices. The mixture was heated rapidly to 120° C. under a gentle stream of nitrogen. The temperature was then raised gradually to 190° C. over the course of 4 hours and the water of condensation produced was removed by distillation.

A resin was obtained which had an acid number of 11 and viscosities of 1540 mPas at 25° C. and of 260 mPas at 50° C.

EXAMPLE 2

| | |
|---|---|
| 661.10 g of dicyclopentadiene | (5.0 mol) and |
| 490.30 g of maleic anhydride | (5.0 mol) | were weighed into a stirring flask fitted with heating device and reflux condenser. The mixture was heated to 125° C. under a gentle stream of nitrogen, and then

| | |
|---|---|
| 95.00 g of water | (5.0 mol + 5 g) | were added from a dropping funnel over the course of one hour. Reaction was allowed to continue at 125° C. for one hour. A monocarboxylic acid of the formula (V) was formed. The contents of the flask were cooled to 70° C., and then

| | |
|---|---|
| 245.15 g of maleic anhydride | (2.5 mol) |
| 557.15 g of 1,6-hexanediol | (5.5 mol) |
| 4.00 g of dibutyltin dilaurate (DBTL) and | |
| 0.50 g of hydroquinone | | were added. The mixture was heated rapidly to 120° C. under a gentle stream of nitrogen. Then the temperature was raised gradually to 190° C. over the course of 6 hours and the water of condensation produced was removed by distillation.

A highly viscous resin is obtained having an acid number of 18 and viscosities of 7840 mPas at 50° C. and 2016 mPas at 75° C.

EXAMPLE 3

| | |
|---|---|
| 1586.52 g of dicyclopentadiene | (12.0 mol) and |
| 1176.72 g of maleic anhydride | (12.0 mol) | were weighed into a stirring flask fitted with heating device and reflux condenser. The mixture was heated to 125° C. under a gentle stream of nitrogen, and then

| | |
|---|---|
| 226.00 g of water | (12.0 mol + 10 g) | were added from a dropping funnel over the course of one hour. Reaction was allowed to continue at 125° C. for one hour. A monocarboxylic acid of the formula (V) was formed.

The contents of the flask were cooled to 70° C., and then

| | |
|---|---|
| 715.00 g of 1,6-hexanediol | (6.05 mol) |
| 4.00 g of dibutyltin dilaurate (DBTL) and | |
| 0.50 g of hydroquinone | | were added. The mixture was heated rapidly to 120° C. under a gentle stream of nitrogen. Then the temperature was raised gradually to 190° C. over the course of 6 hours and the water of condensation produced was removed by distillation.

A flexible resin was obtained having an acid number of 24 and viscosities of 3650 mPas at 50° C. and 944 mPas at 75° C.

EXAMPLE 4

| | |
|---|---|
| 661.10 g of dicyclopentadiene | (5.0 mol) and |
| 490.30 g of maleic anhydride | (5.0 mol) | were weighed into a stirring flask fitted with heating device and reflux condenser. The mixture was heated to 125° C. under a gentle stream of nitrogen, and then

| | |
|---|---|
| 95.00 g of water | (5.0 mol + 5 g) | were added from a dropping funnel over the course of one hour. Reaction was allowed to continue at 125° C. for one hour. A monocarboxylic acid of the formula (V) was formed.

The contents of the flask were cooled to 70° C., and then

| 1859.00 g of TP 200 | (5.5 mol-equivalents of OH) |
|---|---|

(TP 200 is an ethoxylation product of 1 mol of trimethylolpropane and 20 mol of ethylene oxide)
  3.00 g of dibutyltin dilaurate (DBTL) and
  0.30 g of hydroquinone
were added. The mixture was heated rapidly to 120° C. under a gentle stream of nitrogen. Then the temperature was raised gradually to 190° C. over the course of 6 hours and the water of condensation produced was removed by distillation. A highly viscous, liquid resin was obtained having an acid number of 21 and viscosities of 9340 mPas at 25° C. and 1560 mPas at 75° C.

EXAMPLE 5

| 661.10 g of dicyclopentadiene | (5.0 mol) and |
|---|---|
| 490.30 g of maleic anhydride | (5.0 mol) | were weighed into a stirring flask fitted with heating device and reflux condenser. The mixture was heated to 125° C. under a gentle stream of nitrogen,
and then

| 95.00 g of water | (5.0 mol + 5 g) |
|---|---| were added from a dropping funnel over the course of one hour. Reaction was allowed to continue at 125° C. for one hour. A monocarboxylic acid of the formula (V) was formed.
  The contents of the flask were cooled to 70° C., and then

| 683.40 g of diethylene glycol monoethyl ether | (5.1 mol) |
|---|---|
| 4.00 g of dibutyltin dilaurate (DBTL) and | |
| 0.50 g of hydroquinone | | were added. The mixture was heated rapidly to 120° C. under a gentle stream of nitrogen. Then the temperature was raised gradually to 190° C. over the course of 6 hours and the water of condensation produced was removed by distillation.
  A low-viscosity substance was obtained having an acid number of 32 and viscosities of 290 mPas at 25° C. and 134 mPas at 50° C.
  Testing the products of Examples 1 to 5 for curability
  The products prepared in Examples 1 to 4 were heated to 40° C. for greater ease of stirring and were mixed in a ratio of 70:30 with the product obtained in Example 5. Then 4% of t-butyl perbenzoate and 3% of benzophenone, based on the overall amount, were added.
  These mixtures flow readily at room temperature and have the following viscosities at 40° C.:
  Example 1+Example 5: 480 mPas
  Example 2+Example 5: 2090 mPas
  Example 3+Example 5: 1160 mPas
  Example 4+Example 5: 880 mPas Each of these mixtures were then poured into a high-sided metal tray to a depth of about 2 cm. The trays were then irradiated on a hotplate at 50° C., using a medium-pressure mercury lamp, at an energy level of 80 mW/cm$^2$ for 60 seconds, forming a slightly tacky skin with a thickness of about 0.5 mm beneath which the main composition is still liquid. The trays were then heat-treated at 140° C. in an oven for 4 hours. After cooling, resin blocks showing compact through-curing were obtained.
  Samples of the catalyzed, ready-to-use mixtures were stored at 40° C. for 48 hours. Subsequently it was found that neither their viscosity nor their curing characteristics had altered.
  Further samples of the mixtures were mixed with 4% of methyl isobutyl ketone peroxide, 2% of cobalt octoate (1% strength in toluene) and 3% of benzophenone. Each of these mixtures was poured into a high-sided metal tray to a depth of about 2 cm. The trays were the irradiated at room temperature, using a medium-pressure mercury lamp, with 80 mW/cm$^2$ for 60 seconds, to form a slightly tacky skin with a thickness of about 0.5 mm beneath which the main mass is still liquid. The trays were then stored at room temperature (about 25° C.). After 24 hours, resin blocks were obtained which showed compact through-curing. The nonirradiated residues of the mixtures are cured through after 48 hours. These experiments illustrate the possibility for cold curing of the novel substances.
  We claim:
  1. Impregnating, casting and coating compositions for electrical and electronic components and for carrier materials for sheet-form insulating materials, comprising saturated or unsaturated polyester resins, or mixtures of saturated and unsaturated polyester resins, which do not comprise any vinylic unsaturated monomers, and which contain structural units of the general formulae (I) and/or (II)

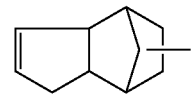

(I)

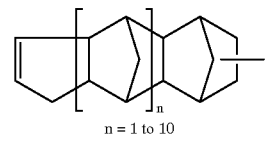

(II)

n = 1 to 10 wherein the structural units of the formulae (I) and/or (II) have been introduced by using compounds of the formulae (V) and/or (VI)

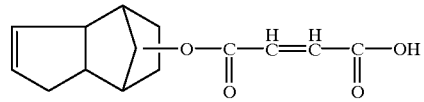

(V)

-continued

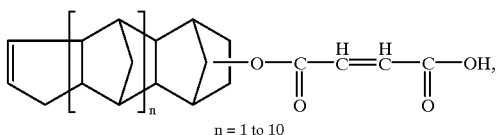
(VI)

n = 1 to 10 wherein esterfication products of the compounds of the formulae (V) and/or (VI) with monofunctional alcohols, olyfunctional alcohols, alkoxylation products thereof, polyetherpolyols or polyesterpolyols are employed in addition, and wherein the impregnating, casting and coating compositions are liquid at room temperature.

2. Compositions as claimed in claim 1, wherein the structural units of the general formula (I) and/or (II) are incorporated in the form of esters of dihydrodicyclopentadienol with monomeric or polymeric carboxylic acids, comprising groups of the formula (III), and/or in the form of esters of oligodihydrodicyclopentadienol with monomeric or polymeric carboxylic acids, comprising groups of the formula (IV)

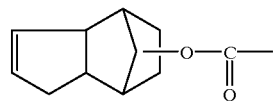
(III)

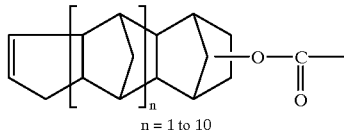
(IV)

n = 1 to 10

3. Compositions as claimed in claim 1, wherein the polyesters have been synthesized using alcohols and polyols which are ethoxylated or propoxylated.

4. Compositions as claimed in claim 1, wherein the polyesters have been synthesized using mono- or polyhydric alcohols chosen from the group consisting of polyesterpolyols or polyetherpolyols.

5. Compositions as claimed in claim 1, wherein ethylenically unsaturated structural units have been used in synthesizing the polyesters.

6. Compositions as claimed in claim 1, wherein the compositions include chemically bonded photoinitiators containing xanthone, thioxanthone and/or phenone structures.

7. Compositions as claimed in claim 6, wherein the chemically bonded photoinitiator incorporated by condensation into the polyester resins is hydroxybenzophenone and/or benzophenonetetracarboxylic acid.

8. Compositions as claimed in claim 1, wherein the impregnating, casting and coating compositions are cured with peroxides, with or without reaction-accelerating co-initiators, at room temperature or elevated temperature.

9. Compositions as claimed in claim 8, wherein the impregnating, casting and coating compositions are cured first of all up to a partially cured B-stage, before being cured to completion later on.

10. Compositions as claimed in claim 1, wherein the impregnating, casting and coating compositions are cured with actinic radiation, the photoinitiators required either being chemically bonded in the compositions or having been added to the compositions, or using both chemically bonded and added photoinitiators.

11. Compositions as claimed in claim 10, wherein curing with actinic radiation and curing with free-radical initiators are combined.

12. Compositions as claimed in claim 1, wherein esterification products of the compounds of the formulae (V) and/or (VI) with monofunctional imido-containing alcohols or acids and/or polyfunctional imido-containing alcohols or acids and/or imido-containing hydroxy acids are included.

13. Compositions as claimed in claim 1, wherein in order to reduce the viscosity of the impregnating, casting and coating compositions they are heated on application.

* * * * *

UNITED STATES PATENT AND TRADEMARK OFFICE
CERTIFICATE OF CORRECTION

PATENT NO. : 6,162,840
DATED : December 19, 2000
INVENTOR(S) : Blum et al.

It is certified that error appears in the above-identified patent and that said Letters Patent is hereby corrected as shown below:

Column 13, claim 1,
Line 12, "olyfunctional" should be -- polyfunctional --.

Column 14, claim 13,
Line 41, after "application" insert -- or, where they are solids, they are melted --.

Signed and Sealed this

Twenty-fifth Day of September, 2001

Attest:

NICHOLAS P. GODICI
Attesting Officer    Acting Director of the United States Patent and Trademark Office